May 22, 1962 P. A. GUINARD 3,035,596
BY-PASS RELIEF VALVE
Filed June 28, 1960 7 Sheets-Sheet 1
FIG: 1
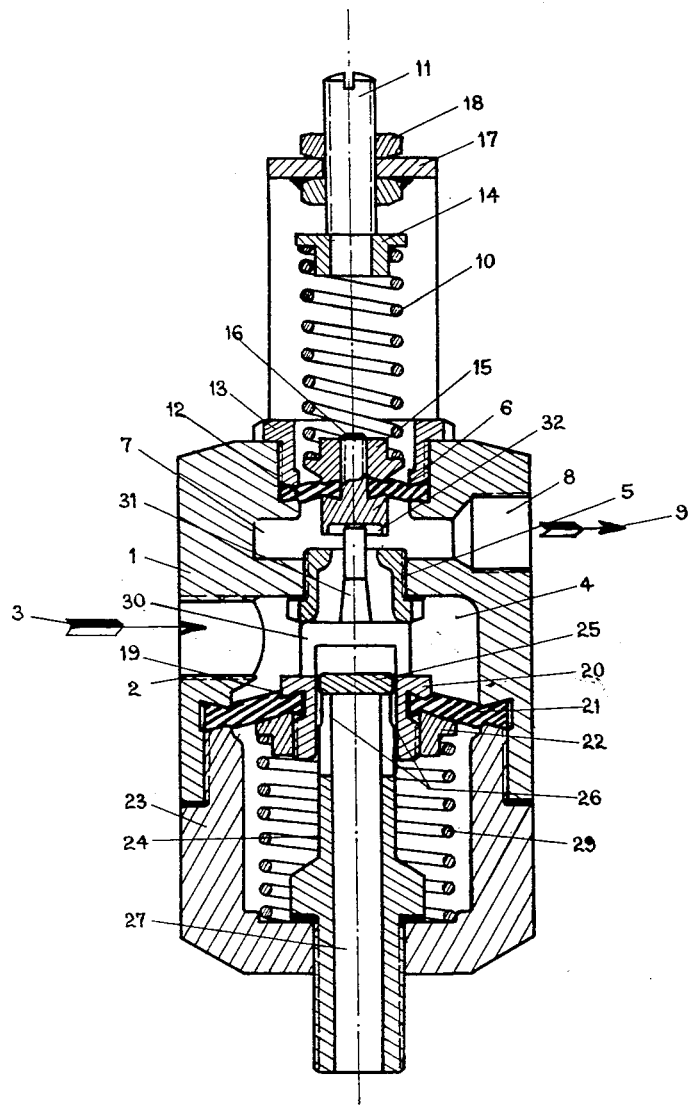

FIG:2
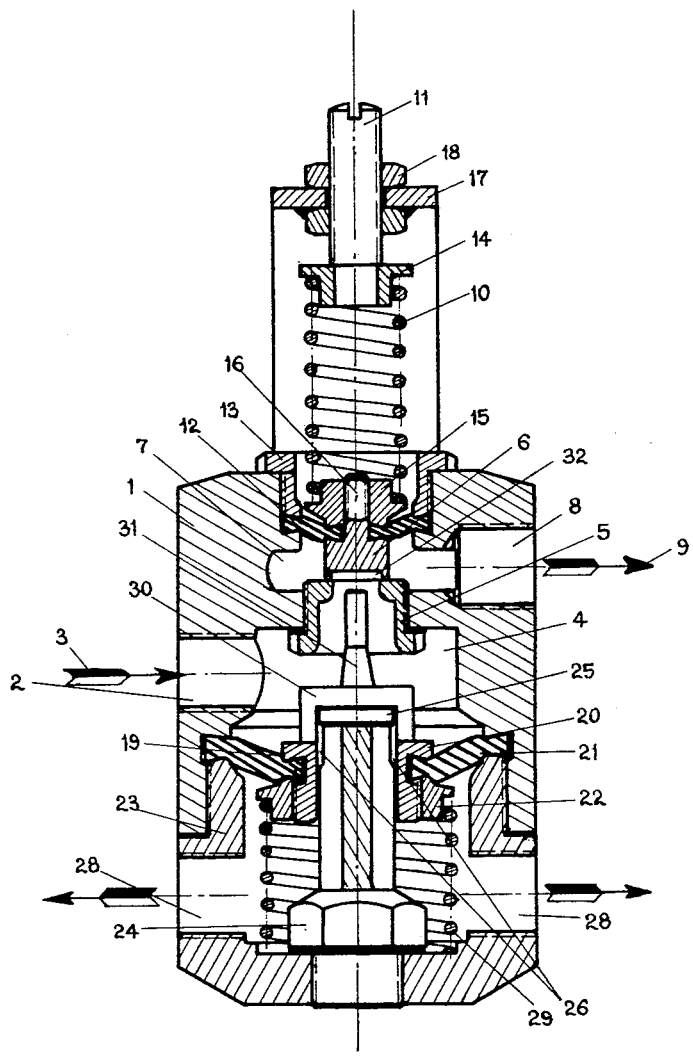

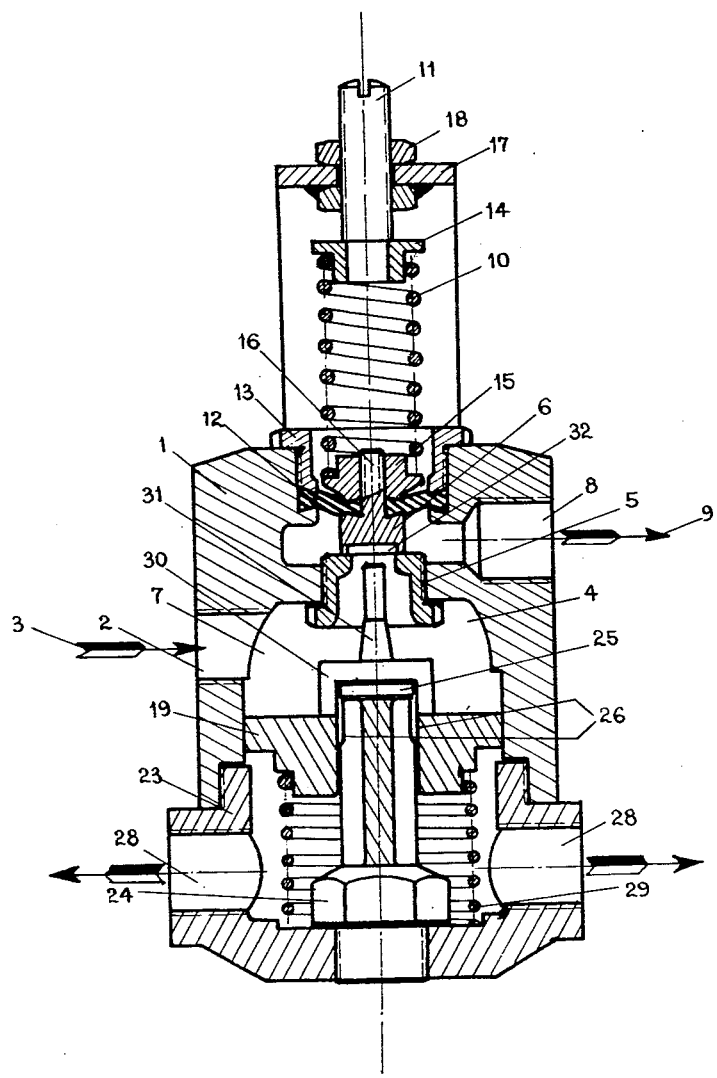
FIG: 3

FIG: 4
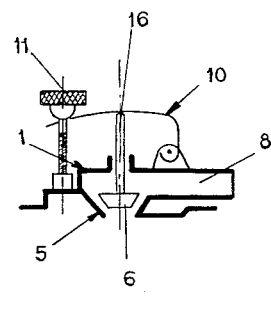
FIG: 5
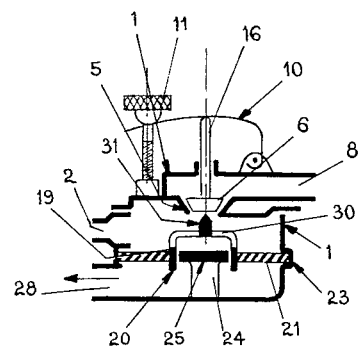
FIG: 6
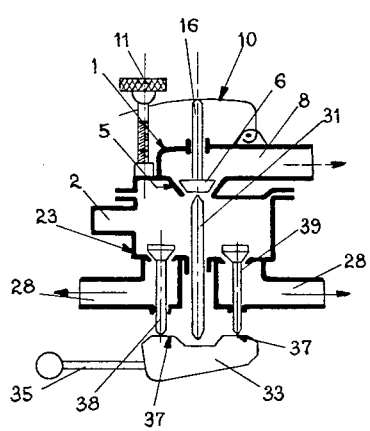
FIG: 7
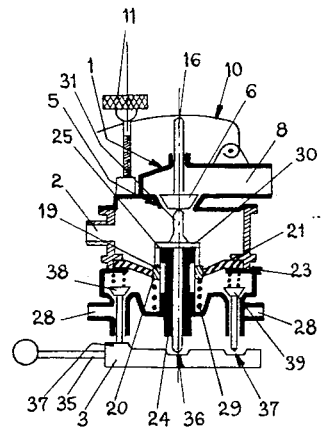

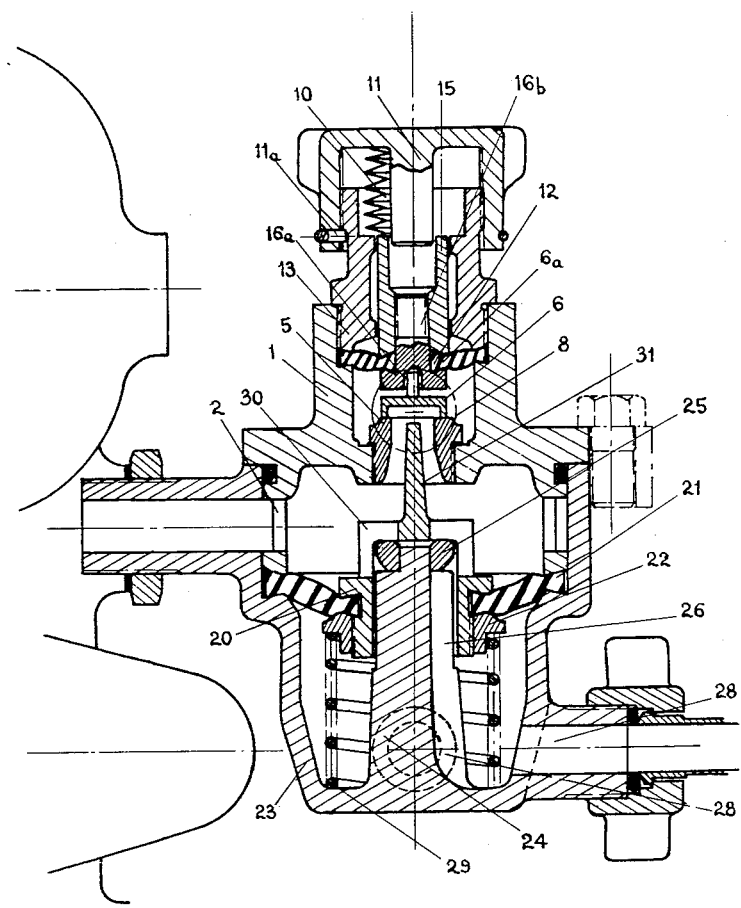

FIG: 9
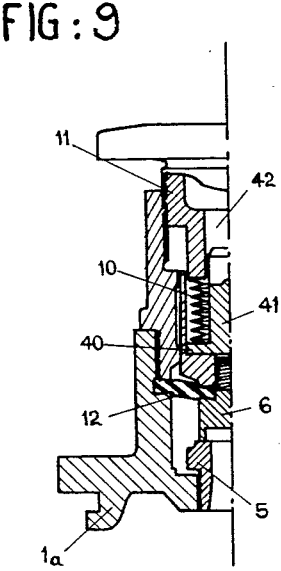
FIG: 10
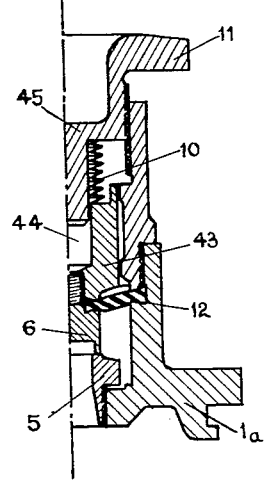
FIG: 11
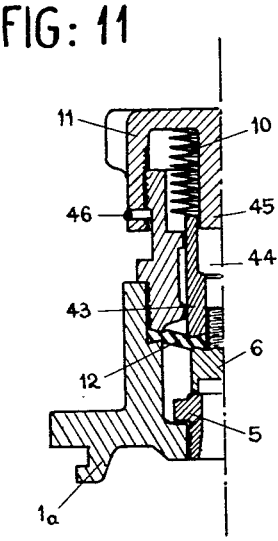
FIG: 12
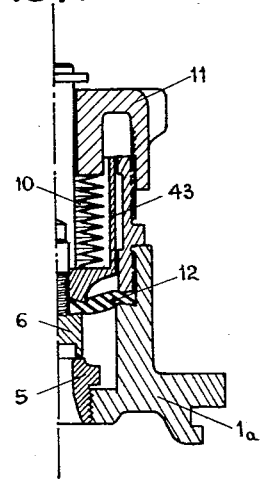

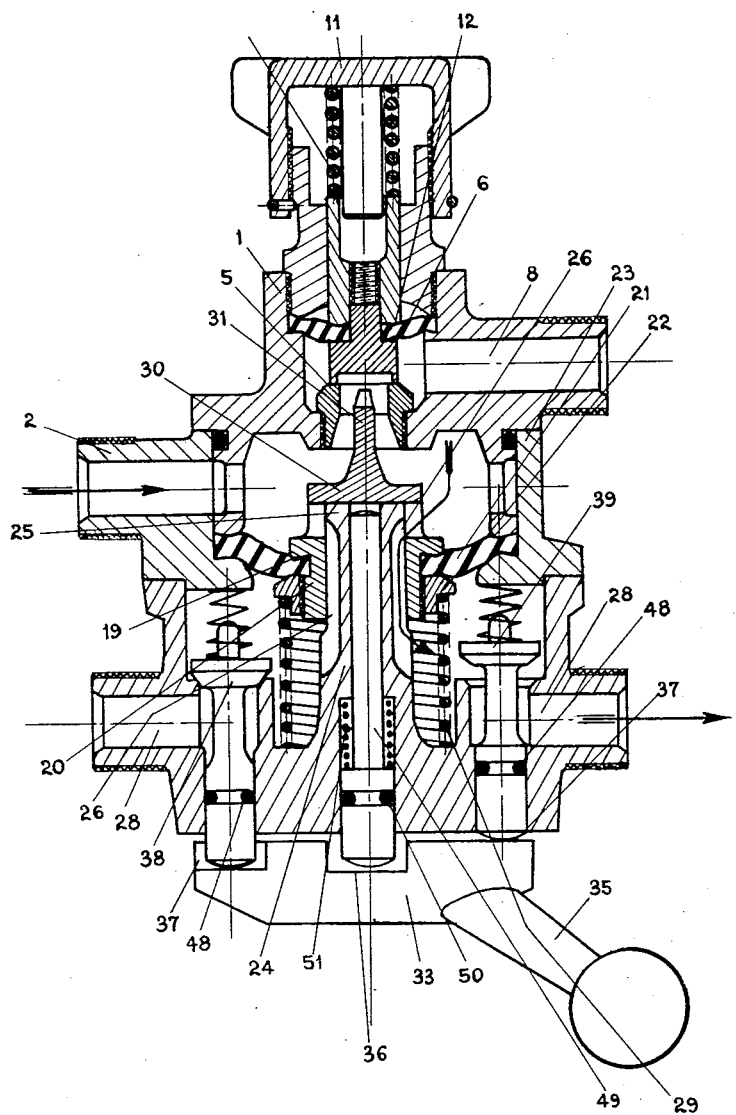
FIG: 13

United States Patent Office 3,035,596
Patented May 22, 1962

3,035,596
BY-PASS RELIEF VALVE
Paul André Guinard, Saint-Cloud, France
Filed June 28, 1960, Ser. No. 39,374
Claims priority, application France July 7, 1959
9 Claims. (Cl. 137—116)

In the plants for the supply of a fluid under pressure which include supply apparatus such as motor actuated pumps and utilizing or receiving apparatus, it is customary to dispose a relief-valve on the path of the fluid flowing from the first apparatus to the second. When the receiving apparatus are put out of action, the problem arises of reducing the overpressure thus applied to the supply apparatus and particularly to the motor. Devices have been provided to produce a discharge relieving these motors when the normal flow is interrupted by a stopping device remote from the pump. These devices make use generally of the overpressure at the cut off to produce the required discharge but they are delicate, costly and yield results which are not invariable and are always different in relation to the cut-off period of the utilizing apparatus.

The present invention allows to cope with the above mentioned drawbacks and consists, to bring about the desired fall of pressure, in utilizing the stoppage or the limitation of the useful flow instead of the overpressure at the stoppage, as in the known apparatus.

One utilizes therefore a member moving along a rectilinear path, hereafter described as a flow-feeler, the position and the importance of the shifting of which are a function of the flow used by the utilizing apparatus and which acts positively upon a relief-valve to open it as soon as this flow falls down to a value lower than a previously determined value, said relief valve still operating normally as a safety-valve as soon as it is no more subjected to the action of the flow feeler.

One understands that, under such conditions, the stoppage of the flow of the fluid under pressure in the utilizing apparatus brings about automatically, which the flow falls below the limit value—chosen in function of the nature and use of the utilizing apparatus, the opening of the relief-valve and thereby the pressure fall which relieves the motor.

The present invention applies to all the means carrying into effect the general characteristic previously mentioned and particularly to different forms of embodiment and particulars taken apart or in their various combinations.

(a) The flow feeler which has an annular shape is shiftable upon a stationary axial element intended for the admission of the fluid under pressure in the utilizing apparatus and has a larger area than the area of the relief-valve upon which said feeler can act directly and positively to secure its opening; one of the faces of this feeler is, like the relief valve, directly subjected to the pressure of the fluid supplied by the generating apparatus and the other face is exposed, on the one hand, to the action of a spring and, on the other hand, to the pressure existing between the feeler-distributor and the utilizing apparatus.

(b) The flow feeler can be constituted by the combination of a tubular central distribution member and of an annular, elastically distortable wall, tightly jointed, on the one hand, by its inner edge with the tubular member and, on the other hand, by its periphery with the body of the apparatus.

(c) The flow feeler can be constituted by a piston movable in a cylindrical part of the body of the apparatus and which includes an axial bore engaged upon the stationary axial admission element.

(d) The flow feeler includes a catch provided with an axial push-rod acting directly and positively upon the relief-valve.

(e) The relief-valve can be of any suitable type and is advantageously constituted by a clack tightly mounted upon the center part of an elastically distortable wall, peripherally and tightly fixed in the body of the apparatus.

(f) The outfit constituted by the device intended to bring about a pressure fall and by the relief valve can be combined with a distributor allowing to afford at will the liquid into one or several utilization apparatus.

(g) The self acting device for the pressure fall can be combined with a hand-operated device, forming thereby a device securing the safety and the unsticking of the relief-valve.

The invention is also concerned with other particulars which will appear in the following description given with reference to the annexed drawing and by way of example only.

FIGURE 1 is an elevation sectional view of the whole of a first form of embodiment of an improved device for pressure fall according to the invention, the various elements being in the position corresponding to the cutting off of the utilizing apparatus.

FIGURE 2 is a similar view of another form of embodiment, the various elements being in the position corresponding to the working of the utilizing apparatus.

FIGURE 3 is also an elevation sectional view of another form of embodiment, the various elements being in the position corresponding to the working of the utilizing apparatus.

FIGURE 4 illustrates schematically another form of embodiment of a relief-valve, shown separately.

FIGURE 5 illustrates also schematically said relief valve combined with an automatic device for the pressure fall.

FIGURE 6 illustrates schematically a distributor with a hand operated control for the pressure fall, shown separately.

FIGURE 7 illustrates schematically a device for the automatic pressure fall according to the invention, combined with a manually operated distributor, as shown in FIGURE 6.

FIGURE 8 is an elevation sectional view of a detailed form of embodiment corresponding to the schema of FIGURE 5.

FIGURES 9, 10, 11, 12, are partial sections of different forms of embodiment of the relief clack.

FIGURE 13 is a detailed section corresponding to the schema of FIGURE 7.

The device to produce a pressure fall, illustrated in FIGURE 1, includes a body 1 in which is provided a bore 2 for the connection of an inlet pipe for the supply of a fluid under pressure (as indicated by arrow 3), the fluid being supplied by a pump or a compressor, driven by a motor. The device can generally be used with any liquid or gaseous fluid but is more particularly intended for the plants including a volumetric pump delivering a liquid under pressure (water, mineral-oil products, liquids for cryptogamic treatments or others) to utilization or supply apparatus.

In the body 1, having a chamber 4 facing the inlet 2, is mounted a seat 5 for a relief valve 6 disposed in a chamber 7 in which is provided a port 8 for the discharge of the liquid in the direction of the arrow 9, when the pressure of this liquid is above the measurement value as indicated by a draw-spring 10, which can be adjusted by means of a screw 11. According to a characteristic of the invention, this clack-valve 6 is tightly mounted on the center part of an elastically distortable membrane 12, rigidly and tightly clamped by a threaded ring 13 upon the body 1. The measurement spring 10 of the clack-valve 6 bears, on the one hand, on a piece 14 mounted on the end of the screw 11, and, on the other hand, on a piece 15 which is screwed on the stem 16 of the valve 6 and is used to fix this valve 6 on the center part of the membrane 12. The screw 11 is mounted in a stirrup 17, integral with the body 1, a lock-nut 18 also being provided.

According to one of the chief characteristics of the present invention, the wall of the chamber 4, opposite the relief valve 6 is formed by a flow feeler, constituted in the form of embodiment illustrated in FIGURES 1 and 2, by a central tubular element 20 and an annular elastically distortable membrane 21 which is rigidly and tightly clamped by its inner edge to the tubular element 20 by means of a threaded ring 22 and which is peripherally tightly and rigidly fixed by a piece 23 on the body 1.

A central element 24, axially fixed upon the piece 23 forms at its end engaged in the tubular element 20 a valve shutter 25 under which are provided ports or channels 26 to allow the liquid under pressure, when the flow-feeler is released from this valve shutter (as shown in FIGURE 2) to flow towards the utilization apparatus, either through the central channel 27 (form of embodiment of FIGURE 1), or through the outlets 28 (as shown in FIGURE 2). In this FIGURE 2, the members similar to those of FIGURE 1 are designated by the same reference numbers and thereby have not to be particularly described. The same occurs for FIGURE 3 illustrating another form of embodiment in which the flow-feeler 19 is formed by a single tubular piece or piston, movable in a bore provided in body 1.

The flow feeler 19 is constantly biased by a spring 29 in the direction of the relief-valve 6 and it includes a stirrup 30 axially provided with a push-rod 31 securing the direct and positive up-lifting of the relief-valve 6, when the flow feeler is in the position illustrated in FIGURE 1.

It is to be noted that the relief-valve 6 includes a recess 32 allowing to reduce the positive pressure divergence appearing between the positions of reduced opening and full opening of said relief-valve 6.

The above described device works as follows:

Normally, atmospheric pressure prevails in all the enclosed spaces and, on account of the predominance of the action of the spring 10 over that of the spring 29, the relief-valve 6 rests upon its seat 5 and the flow-feeler 19 is slightly moved downwards without being entirely freed from the cut-off 25, the push-rod 31 being in contact with the relief-valve 6.

As soon as the supply of liquid under pressure is started, the utilization apparatus being open, the liquid under pressure flows through the input 2 into the chamber 4, between the relief-valve 6 and the flow-feeler 19 which is moved, on account of its large area and against the action of the spring 29, to come in the position illustrated in FIGURES 2, 3, in which the utilization apparatus is fed and works normally, the relief-valve 6 being able to play its usual part as relief-valve in the case of an accidental overpressure exceeding the predetermined and adjustable sealing value of this valve 6.

If the utilization apparatus, fed by means of pipes connected with the outlet 27 (FIGURE 1) or the outlets 28 (FIGURE 2), is temporarily shut off on account of the requirements of the work, the pressure is balanced on both sides of the flow-feeler 19 and this feeler, under action of its spring 29, moves so that the push-rod 31 first bears upon the relief-valve 6 and then brings about the lifting of said valve, as illustrated in FIGURE 1 to produce the pressure fall desired to relieve the motor-pump group. This action is possible since the relief-valve 6 is, on the one hand, urged in its open position by the pressure of the liquid and by the spring 29 and, on the other hand, urged in its closed position by its scaling spring which is adjusted slightly above the liquid pressure, so that the action of the spring 29 becomes preponderant to bring about the opening of the relief-valve 6 and the desired discharge, as indicated, the liquid being discharged outside through the opening 8 to come back as a rule to the feeding tank.

If the reduced output at the utilizing apparatus is nevertheless sufficient to maintain the flow-feeler in the open position (FIGURE 1), the relief-valve 6 works as an ordinary safety-valve to discharge the excess of liquid flowing through the inlet 2.

The radial play between the cut-off 25 and the flow-feeler 19 is adjusted so that the loss of pressure of the liquid flowing in this annular space corresponds to a stress upon the flow-feeler which balances the action of the spring 29. Under these conditions, when the output used at the utilizing apparatus becomes smaller than the predetermined value, the spring 29 becomes preponderant and the flow-feeler comes back in the position illustrated in FIGURE 1, in which the push-rod 31 actuates positively the relief-valve 6 to move it from its seat and to produce the desired discharge.

This discharge is intentionally incomplete and such that the addition of the pressure fall below the relief-valve 6 and the action of the push-rod 31 is greater than the action of the spring 10, up to the position of pressure fall.

Thus the relief-valve 6 is mounted on the central part of the elastically distortable wall 12, this valve bears always in a perfectly tight way upon its seat. In addition, as this valve is periodically and positively lifted from its seat during the working period to produce the desired discharge, the dangers of a sticking of this valve which occurs often with some products, particularly when used for sprayings, are avoided. Also, the flow-feeler 29 which works, in the way of a punch, in combination with the cut-off 25 forming the end of the stationary piece 24 prevents the blocking-up of this flow-feeler: besides it slarge area secures an easy unsticking under the action of the fluid pressure.

It must be understood that the improved above described device for pressure fall can be adapted according to the requirements, without departing from the frame of the invention. For instance, the characteristics of the springs 10 and 29, the scaling adjustment of these springs, the distance of the end of the push-rod 31 in relation to the cut-off 25 when this push-rod is in contact with the valve 6 in the closed position may be determined so as to obtain the value of the desired discharge in all the conditions differing from the conditions of normal use of the utilizing apparatus.

This relief valve, schematically illustrated in FIGURE 1 and which can be used independently, is fitted on the devices schematically illustrated in FIGURES 5, 6, 7. This relief-valve, including a body 1 and a clack 6 provided with a stem 16, is normally urged upon its seat 5 by a spring 10, the tension of which can be adjusted by means of a member 11, the discharge taking place through the pipe 8. The spring 10 illustrated in this schema is a plate-spring, hinged at one end; other equivalent devices can be used, as it will be indicated later with reference to FIGURES 8 and 9 to 13.

In the schema of FIGURE 5, the principle of which corresponds to the FIGURE 2, are shown not only the relief-valve but also the flow-feeler 19. The flow-feeler is constituted by a tubular element 20, an elastically distortable member 21 which is tightly clamped at its inner edge to this tbular element by means of a threaded ring 22 (as it appears more specially in FIGURES 8 and 13), the periphery of said ring being rigidly and tightly fixed to the body 23 of the apparatus. A central element 24 of the body 23 forms—or supports—at its end engaging the tubular element 20, an obturator 25 under which appear channels 26 (as shown in FIGURES 8 and 13), to allow the flow of the liquid under pressure in the utilizing apparatus, when the flow-feeler is freed from this obturator.

The schema of FIGURE 5 is illustrated in a very detailed way in FIGURE 8. A special description of the most important organs and of the working is not necessary but some particulars in the construction fall within the scope of the invention. In said FIGURE 8, the clack 6 of the relief valve is provided with a stem, 6a, forming a punch, mounted with some play in a corresponding housing 16a of a member 16b which is screwed in a part 15 and secures also tight fixation upon a membrane 12. A member 13 on the body 1 clamps the periphery of the membrane on the body 1. As a result of the mounting with some play on the clack 6, this clack bears always correctly and tightly on its seat 5. When a discharge occurs through this clack 6, the liquid flows, through the channel 8 and the diagrammatically illustrated pipe 8a, towards the suction side of the pump or to a container. It is to be noted also that, in this form of embodiment, the adjustable element for the calibration of the relief valve is constituted by a set of cup springs 10, the tension of which can be adjusted by means of the plug 11, the unscrewing of this plug being limited by a stop 11a.

In FIGURE 13 appears the schema of FIGURE 7. The fall of pressure is not automatically carried out but by means of a hand operated device separately shown in FIGURE 6 and including a distributing plate 33, journalled on an axis 34, which can be angularly displaced by a lever 35. The plate includes gradients 36, 37. The gradient 36 allows to act upon the push-rod 31 to obtain the lifting of the clack 6 of the relief-valve. In addition, the delivery to the utilizing apparatus is secured by the gradients 37 acting, either upon the clack 38, or upon the clack 39 or simultaneously on both, as the case may be.

The FIGURES 9, 10, 11, 12, illustrate, partly and in cross section, several forms of embodiment of a device intended for the calibration of the relief-valve, in which cup springs 10 are used, the calibration being adjusted by means of a knob 11.

In the embodiment of FIGURE 9, the cup springs 10 are disposed between the knob 11 and a flange 40 of a member 41 which is guided in a cylindrical housing 42 provided in the knob 11.

In FIGURE 10, the cup washers are placed between the knob 11 and a member 43 which is integral with the clack 6 and is used to maintain, in a tight way, the central part of the membrane 12. The member 43 is axially provided with a cylindrical housing 44 and is guided by an axial cylindrical projection 45 of the knob 11.

FIGURE 11 is similar to FIGURE 10 but the member 43 is slightly modified: in addition, the knob 11 is provided with a stop 46, to limit its unscrewing.

In FIGURE 12, the member 43 is guided at its periphery only, and this allows to place a larger number of cup washers, the point of support of which is lower and in the immediate vicinity of the clack 6, thereby securing an improved guiding for this clack. The clack can, in addition, be mounted with a slight play as shown in FIGURE 8.

In the schema of FIGURE 7 and the detailed construction diagram of FIGURE 13, the automatic fall of the pressure is combined with a distributor able to safely secure the manual operation of this fall of pressure.

In this form of embodiment, the same organs, previously described, and illustrated in the diagrammatic FIGURES 5 and 6 and in the constructive FIGURE 8, are to be found and the same organs, designated by the same reference numbers need not to be described anew: in the embodiment illustrated in FIGURE 13, the constructive details hereafter mentioned are to be noticed. The valves 38, 39 include toroidal joints 48 to secure the tightness. The gradient 36 does not directly actuate the push-rod 31 by means of an extension of said push-rod but through a stem 49 which is shiftable in an axial bore in the central element 24. This stem is provided with a toroidal joint and is also biased constantly by a spring 51 against the gradient 36 of the distributor 33-35. This arrangement allows to keep, with a sufficient guarding, the automatic working of the pressure fall, but allows also to produce this pressure fall at will and by manual action.

It is plain that the forms of embodiment above described and illustrated are given by way of example only: most generally, all changes or modified forms which do not change in any way the principal characteristics above mentioned, nor the objective aimed at, remain included in the scope of the present invention.

What I claim is:

1. In a plant for supplying a fluid under pressure and including a supply device for supplying said fluid and a utilization device for utilizing said fluid, an unloader valve comprising a casing, at least one inlet pipe connected with said supply device and opening into said casing, at least one first discharge pipe connected with the utilization device and opening into said casing, at least one second discharge pipe opening into said casing and also adapted to discharge fluid from said casing, an element fixed to the casing including a solid end part and having outlet channels under said end part and adapted for being put into communication with said first discharge pipe, a movable flow responsive tubular unit located between said inlet pipe and said first discharge pipe and dividing said casing into two chambers, the said movable tubular unit having opposite faces and being subjected on one face to fluid pressure from the inlet pipe and on the other face to fluid pressure in said first discharge pipe, said movable tubular unit slidingly cooperating with said end part of said element and being peripherally and tightly mounted in said casing, a clearance provided between said end part of said element and said tubular unit, a first elastic means acting on said movable tubular unit along with the pressure in said first discharge pipe, a valve seat fixed to the casing coaxially with said fixed element and with said movable tubular unit and arranged between said inlet pipe and said second discharge pipe, a valve clack tightly connected to the casing but displaceable with respect thereto and cooperating with said valve seat for establishing and terminating communication from said inlet pipe to said second discharge pipe, a second elastic means stronger than said first elastic means and urging said valve clack towards said valve seat, and means mounted upon said movable tubular unit and positioned to act on said valve clack for positively displacing the same from the valve seat.

2. An unloader valve according to claim 1 wherein the element fixed to the casing is a hollow tube including a wall through which extend said channels, said tube being directly connected to the first discharge pipe.

3. In a plant for supplying a fluid under pressure and including a supply device for supplying said fluid and a utilization device for utilizing said fluid, an unloader valve comprising: a casing, at least an inlet pipe connected with the supply device and opening into said casing, at least one first discharge pipe connected with the utilization device and opening into said casing, at least one second discharge pipe opening into said casing and also adapted to discharge fluid from said casing, an element fixed to the casing including an end part and having outlet channels adapted for communicating with said first discharge pipe, a movable flow responsive tubular unit comprising a rigid tubular element and a solid annular membrane fixed on the rigid tubular element and tightly and peripherally fixed to the casing, said flow responsive tubular unit being located between said inlet pipe and said first discharge pipe and dividing said casing into two chambers, the said movable tubular unit having opposite faces and being subjected on one face to pressure from the inlet pipe and on the other face to pressure from said first discharge pipe, said movable unit slidingly cooperating with said end part of said fixed element, a clearance provided between said end part of said element and said tubular unit, a first elastic means acting on said movable tubular unit jointly with the pressure in said first discharge pipe, a valve seat fixed to the casing coaxially with said fixed element and with said movable tubular unit and arranged between said inlet pipe and said second discharge pipe, a valve clack tightly connected to the casing but displaceable with respect thereto and cooperating with said valve seat for establishing and terminating communication between said inlet pipe and said second discharge pipe, a second elastic means stronger than said first elastic means and urging said valve clack towards said valve seat, and means on said movable tubular unit to act on said valve clack for positively displacing the same from the valve seat.

4. In a plant for supplying a fluid under pressure including a supply device for supplying said fluid and a utilization device for utilizing said fluid, an unloader valve comprising: a casing, an inlet pipe connected with the supply device and opening into said casing, a first discharge pipe connected with the utilization device and opening into said casing, a second discharge pipe opening into said casing and adapted to discharge fluid from said casing, an elongated element axially fixed to the casing including a solid end part and having outlet channels adapted for communication with said first discharge pipe, a movable flow responsive piston between said inlet pipe and said first discharge pipe and dividing said casing into two chambers, the said movable piston having opposite faces and being subjected on one face to pressure in the inlet pipe and on the other face to pressure in said first discharge pipe, said piston slidingly cooperating with said end part of said element and being peripherally and tightly mounted in said casing, a clearance provided between said piston and said end part of said element, a first elastic means acting on said movable piston jointly with the pressure in the first discharge pipe, a valve seat fixed to the casing coaxially with said element and with said movable piston and arranged between said inlet pipe and said second discharge pipe, a valve clack tightly connected to the casing and cooperating with said valve seat for establishing and terminating communication between said inlet pipe and said second discharge pipe, a second elastic means stronger than said first elastic means and urging said valve clack towards said valve seat, and means on said movable piston to act on said valve clack for positively displacing the same from the valve seat.

5. An unloader valve according to claim 4 wherein the means on said piston is a stirrup fixed on said piston and a push rod fixed on said stirrup.

6. An unloader valve according to claim 4 wherein the valve clack comprises a first part elastically and tightly connected to the casing and including an axial housing, and a second part directly cooperating with the valve seat and including an axial pin entering said housing and permitting the second part to oscillate in relation to the first.

7. An unloader valve according to claim 4 comprising a manual control device for the positive displacement of the clack valve.

8. An unloader valve according to claim 4, wherein the axially fixed element has a perforation from one end to the other, a spring loaded rod sliding in said perforation and acting directly on the means for positively displacing the valve clack, and a manual control device for acting on said rod.

9. An unloader valve according to claim 4, comprising a plurality of discharge pipes in said casing and control means for opening and closing at least one of the latter said pipes.

References Cited in the file of this patent

UNITED STATES PATENTS

| | | |
|---|---|---|
| 1,902,231 | Gurley | Mar. 21, 1933 |
| 2,327,830 | Stevenson | Aug. 24, 1943 |
| 2,619,979 | Le Clair | Dec. 2, 1952 |
| 2,737,966 | Lucien | Mar. 13, 1956 |
| 2,855,945 | Gratzmuller | Oct. 14, 1958 |